3,355,425
ORGANOPOLYSILOXANES
Loren A. Haluska, Midland, Mich., assignor to Dow Corning Corporation, Midland, Mich., a corporation of Michigan
No Drawing. Original application Aug. 6, 1964, Ser. No. 387,988. Divided and this application Jan. 16, 1967, Ser. No. 619,109
5 Claims. (Cl. 260—46.5)

ABSTRACT OF THE DISCLOSURE

A thermoplastic, elastomeric and resinous siloxane polymer of at least one unit of the formula

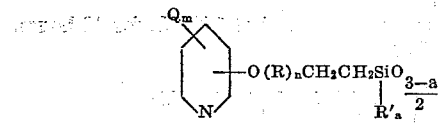

where Q is a lower alkyl radical, R is a divalent hydrocarbon or divalent ether radical, R' is a monovalent hydrocarbon, a hydroxy or a hydrolyzable group, $n$ is an integer of 0 to 1, and $m$ and $a$ are integers of 0 to 2 and any other units present being of the formula

wherein Z is a monovalent hydrocarbon or halohydrocarbon radical and $b$ is an integer of 0 to 3.

---

This is a division of application Ser. No. 387,988, filed Aug. 6, 1964.

This application relates to novel organosilicon compounds that are useful as sizing agents, elastomeric materials, etc.

The compounds of this invention include both silanes and siloxanes. Any silane of this invention can be described as being a compound of the formula

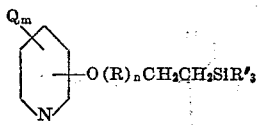

where Q is a lower alkyl radical, R is a divalent radical free of aliphatic unsaturation selected from the group consisting of hydrocarbon radicals and radicals containing carbon, hydrogen, and oxygen in an ether linkage, R' is selected from the group consisting of monovalent hydrocarbon radicals free of aliphatic unsaturation, the hydroxyl group, and hydrolyzable groups, $n$ is an integer of 0 to 1, and $m$ is an integer of 0 to 2.

Q can be any lower alkyl radical such a methyl, ethyl, isopropyl, n-pentyl, or isohexyl.

R can be any divalent radical, as defined above, such as methylene, ethylene, propylene, decylene, octadecylene, 2,5-octylene,

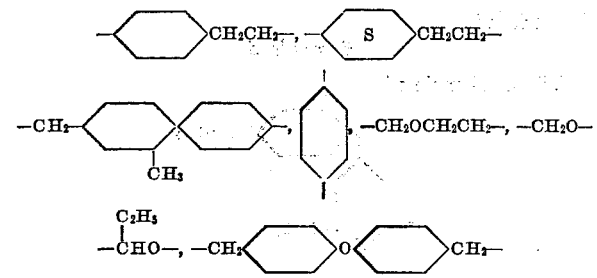

or

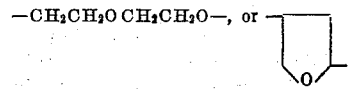

R' can be any monovalent hydrocarbon radical free of aliphatic unsaturation; e.g. alkyl groups such as methyl, ethyl, isopropyl, n-hexyl, 2-ethylhexyl and octadecyl; cycloaliphatic groups such as cyclohexyl and cyclopentenyl; and aromatic-containing groups such as phenyl, tolyl, benzyl, β-phenylpropyl, xenyl and naphthyl, R' can also be the hydroxyl group or any hydrolyzable groups known to the art; e.g., lower alkoxy groups such as methoxy, ethoxy, isopropoxy, butoxy or isohexoxy; alkoxyalkyl groups such as β-methoxyethoxy, β-ethoxyethoxy, and $$O(CH_2CH_2O)_3CH_3$$

acyloxy groups such as formate, acetate, propionate or butyrate; hydrocarbyl-substituted isocyanoxy groups such as

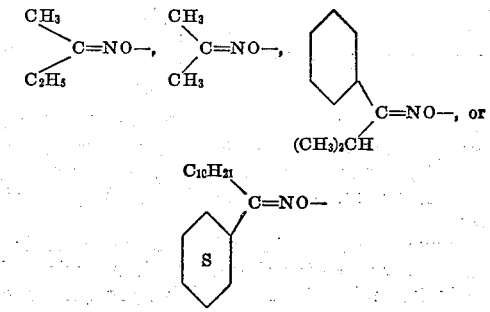

halogen groups: F, Cl, Br, or I; or the isocyanate group.

The siloxanes of this invention are polymeric compositions containing at least one unit of the formula:

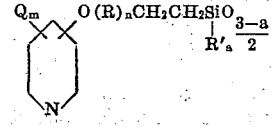

where Q is a lower alkyl radical, R is a divalent radical, free of aliphatic unsaturation, selected from the group consisting of hydrocarbon radicals and radicals containing carbon, hydrogen, and oxygen in an ether linkage, R' is selected from the group consisting of monovalent hydrocarbon radicals free of aliphatic unsaturation, the hydroxyl group, and hydrolyzable groups, $n$ is an integer of 0 to 1, and $m$ and $a$ are integers of 0 to 2, any other units present being of the formula

where Z is selected from the group consisting of monovalent hydrocarbon and halohydrocarbon radicals, and $b$ is an integer of 0 to 3.

Examples of Q, R, and R' are given above.

Z can be any monovalent hydrocarbon radical; e.g., alkyl radicals such as methyl, ethyl, isopropyl, n-hexyl, 2-ethylhexyl, and octadecyl; unsaturated radicals such as vinyl, ethynyl, allyl, butadienyl, or 5-hexenyl; cycloaliphatic radicals such as cyclohexyl or cyclopentenyl; and aromatic containing radicals such as phenyl, tolyl, benzyl, β-phenylpropyl, xenyl or naphthyl. Z can also be any monovalent halohydrocarbon radical; e.g. haloalkyl such as chloromethyl, 3,3,3-trifluoropropyl, β-(perfluoroheptyl)ethyl, or 4-bromohexyl; unsaturated radicals such as 3-chloroallyl or 4,4-difluorobutadienyl; cyclohaloaliphatic radicals such as cholorocyclohexyl or iodocyclopentenyl; and aromatic-containing radicals such as fluorophenyl, α,α,α-trifluorotolyl, or chlorobenzyl.

The silanes of this invention can be made by reacting

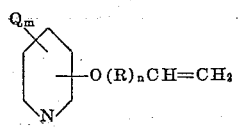

with HSiR′₃ in the presence of a platinum catalyst such as chloroplatinic acid and a suitable solvent such as xylene. If desired, a vinyl polymerization inhibitor such as hydroquinone can also be added.

The reaction is:

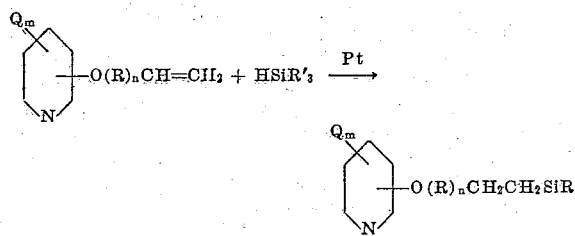

When $n$ is zero, a —CH₂CH₂— group connects the pyridyloxy group to the silicon atom, i.e.

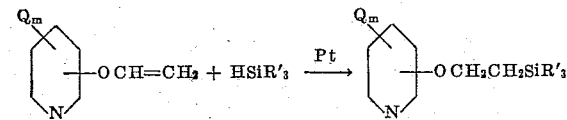

Elevated temperature accelerates the reaction, but temperature, pressure, and proportion of reactants all are not critical. It is, however, desirable to use such pressure that the reaction temperature is below the boiling point of the reactants.

The siloxanes of this invention can be made by hydrolyzing and condensing silanes of this invention which contain hydrolyzable R′ groups. This hydrolysis reaction is well-known to the art.

A pure form of silane can be hydrolyzed to form siloxane homopolymers, or mixtures of silanes can be hydrolyzed to form siloxane copolymers. More than one species of silane of this invention can be cohydrolyzed, if desired, as can also other known silanes of the formula $Z_bSiR′_{4-b}$ where Z and b are defined above, and R′ is a hydrolyzable group, as defined above.

The siloxanes of this invention can also be made by reacting

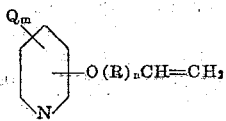

with a siloxane which contains silicon-bonded hydrogen in the presence of a platinum catalyst. This type of reaction is illustrated in the examples below.

The silanes of this invention are suitable as sizing agents and surfactants, while the siloxanes of this invention are useful thermoplastic, elastomeric, and resinous materials.

The following examples are illustrative only and should not be construed as limiting the invention, which is properly delineated in the appended claims.

Example 1

A composition consisting of 270.3 g. of 2-allyloxypyridine, 268.5 g. of methyldiethoxysilane, 248.6 g. of xylene, and 2.0 g. of a solution of chloroplatinic acid in dimethylphthalate (1% by weight platinum) was refluxed at 130° to 143.5° C. for 27 hours.

On distillation there was recovered 198.9 g. of

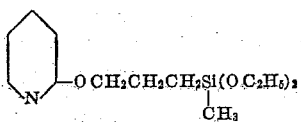

which has a boiling point of 165° C. at 20 mm. Hg pressure, a viscosity at 25° C. of 3.92 cs. and an $n_D^{25}$ of 1.4691.

A portion of this product was placed in a container with a large excess of distilled water and a small amount of KOH. On heating at 100° C. for about 12 hours, a viscous oil was formed which was a homopolymer comprising

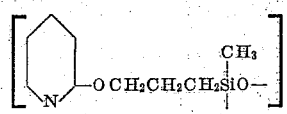

units.

Example 2

One mol (222 g.) of bis-[trimethylsiloxy]methylsilane was heated to 96° C. with 1 g. of chloroplatinic acid in isopropanol (1% Pt).

2-allyloxypyridine was added dropwise, the temperature being allowed to rise to 123° C., until one mole (135.5 g.) had been added.

The mixture was then refluxed at 140° C. for 12 hours. A sizable yield of

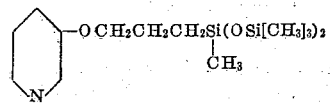

was recovered.

Example 3

To 294.7 g. of phenyldimethylsilane, 2.3 g. of chloroplatinic acid in isopropyl alcohol (1% Pt), and 318 g. of xylene, there was added about 279 g. of 2-allyloxypyridine.

The mixture was refluxed for 42 hours from 120° to 150° C.

On distillation, 118 g. of

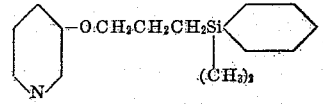

were recovered, as determined by nuclear magnetic resonance and infra-red spectra.

Example 4

When 0.2 mole of

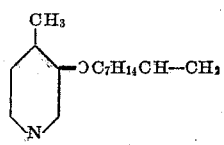

is heated with 0.1 mole of

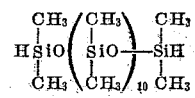

in the presence of platinum, a compound of the formula

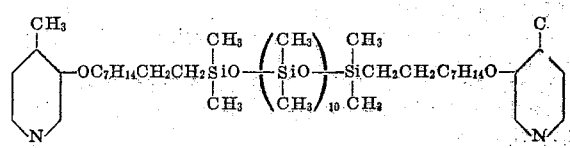

is produced.

Example 5

When 0.1 mole of

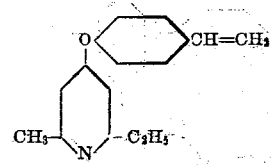

is heated with 0.1 mole of

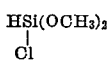

in the presence of platinum, a compound of the formula

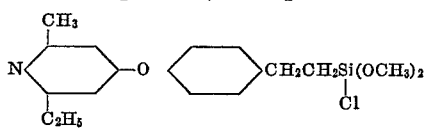

is formed.

That which is claimed is:

1. A polymeric composition containing at least one unit of the formula

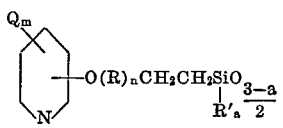

where Q is a lower alkyl radical, R is a divalent radical, free of aliphatic unsaturation, selected from the group consisting of hydrocarbon radicals and radicals containing carbon, hydrogen, and oxygen in an ether linkage, R' is selected from the group consisting of monovalent hydrocarbon radicals free of aliphatic unsaturation, the hydroxyl group, and hydrolyzable groups, $n$ is an integer of 0 to 1, and $m$ and $a$ are integers of 0 to 2, any other units present being of the formula

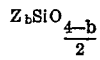

where Z is selected from the group consisting of monovalent hydrocarbon and halohydrocarbon radicals, and $b$ is an integer of 0 to 3.

2. The composition of claim 1 where R is methylene.
3. The composition of claim 1 where R' and Z are both methyl radicals.
4. A homopolymer comprising

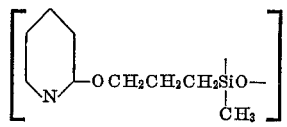

units.

5.

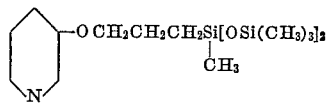

References Cited

UNITED STATES PATENTS 3,071,561   1/1963   Bluestein _____ 260—46.5

DONALD E. CZAJA, *Primary Examiner.*

M. MARQUIS, *Assistant Examiner.*